United States Patent
Shukla et al.

(10) Patent No.: US 12,204,083 B2
(45) Date of Patent: Jan. 21, 2025

(54) CALIBRATION SLIDE FOR CALIBRATION OF AN AUTOMATED MICROSCOPE

(71) Applicant: SIGTUPLE TECHNOLOGIES PRIVATE LIMITED, Bangalore (IN)

(72) Inventors: Abhishek Shukla, New Delhi (IN); Ashish Kumar Lal, Bangalore (IN); Avilash, Jharkhand (IN); Neha Dixit, Bangalore (IN); Deepanker, New Delhi (IN)

(73) Assignee: SIGTUPLE TECHNOLOGIES PRIVATE LIMITED, Bangalore (IN)

( * ) Notice: Subject to any disclaimer, the term of this patent is extended or adjusted under 35 U.S.C. 154(b) by 610 days.

(21) Appl. No.: 17/358,667

(22) Filed: Jun. 25, 2021

(65) Prior Publication Data

US 2022/0317432 A1 Oct. 6, 2022

(30) Foreign Application Priority Data

Mar. 30, 2021 (IN) .............................. 202141014137

(51) Int. Cl.
*G02B 21/26* (2006.01)
*G02B 21/34* (2006.01)

(52) U.S. Cl.
CPC ............. *G02B 21/34* (2013.01); *G02B 21/26* (2013.01)

(58) Field of Classification Search
CPC ....... G02B 21/34; G02B 21/26; G02B 21/365
See application file for complete search history.

(56) References Cited

U.S. PATENT DOCUMENTS

| 2014/0273064 A1* | 9/2014 | Smith | G01N 33/57438 |
| | | | 435/29 |
| 2015/0103401 A1* | 4/2015 | Park | G02B 21/34 |
| | | | 359/396 |
| 2018/0292311 A1* | 10/2018 | Boamfa | G01N 21/278 |

* cited by examiner

*Primary Examiner* — Mustak Choudhury
(74) *Attorney, Agent, or Firm* — HAUPTMAN HAM, LLP

(57) ABSTRACT

The present disclosure discloses a calibration slide for calibration of an automated microscope. The slide includes at least one calibration zone defined on at least one major surface of the sample slide. The at least one calibration zone is divided by a cross hair to define a plurality of quadrants. Each of the plurality of quadrants is defined with an array of apertures of varying density of arrays. The automated microscope including the calibration slide of the present disclosure enables corrective maintenance. The method of the present disclosure may be employed across various automated microscopes within a lab or at labs at various locations through offline/online mode to achieve similar results when tested on same sample.

27 Claims, 4 Drawing Sheets

CALIBRATION SLIDE FOR CALIBRATION OF AN AUTOMATED MICROSCOPE

TECHNICAL FIELD

The present disclosure generally relates to the field of medical devices. Particularly but not exclusively, the present disclosure relates to an automated microscope. Further embodiments of the present disclosure disclose a calibration slide for calibrating automated microscope.

BACKGROUND

Microscopic analysis of biological samples is one of the most common tests performed to diagnose one or more medical conditions of the subject. One such example is biological sample microscopy analysis. Here, the number of Red Blood Cells (RBCs), puss cells, White Blood Cells (WBCs), epithelial cells, microscopic organisms, casts, crystals, yeasts in urine samples are obtained from the analysis which may help the medical practitioners to diagnose medical conditions such as urinary tract infections, kidney disorders and the like.

Certain types of molecular pathology examinations utilize a multiplexing workflow for molecular pathology imaging. When generating images using such a multiplexing workflow, a single slice of tissue (i.e., a single sample) may be used. The multiplexing workflow allows images of the tissue sample acquired over multiple rounds of imaging to be layered, with each round of imaging being directed to a different set of biomarkers applied to the sample. Through the combination of biomarkers acquired over multiple rounds of imaging, a comprehensive view of tissue composition may be attained for the sample.

By way of example, in one such approach the tissue sample is repeatedly stained and bleached during a given imaging protocol. A round of image acquisition may be performed using an automated fluorescence microscope for background acquisition or after each stain or bleach cycle. For example, after an initial stain application a set of images may be acquired, after which the sample may be bleached and stained with the next biomarker and another set of images acquired. Multiple microscopes may be set up to process tissue samples in such a multiplexing workflow. However, in a conventional multiplexing workflow, all rounds of imaging for a given tissue sample are performed on a single microscope to eliminate variability that might otherwise be attributed to the differences in optical, geometric, and/or mechanical properties that may exist between different microscopes. By way of example, depending on the age and/or utilization of the lamps associated with each microscope in a fleet of microscopes, the brightness associated with each microscope may differ, leading to a lack of uniformity in terms of the illumination provided by each microscope.

One problem arising from such an approach for a given lab is how to load-balance a fleet of microscopes when, for example, one microscope is down for repair or is backed up with many tissue samples waiting for additional rounds of imaging while other microscopes sit idle. Among the problems that may exacerbate management of multiple microscopes in such an arrangement is the need to calibrate (e.g., optically, geometrically, mechanically, and so forth) all microscopes within a given lab relative to one another so that the layered images that are produced within a given lab are of high quality and are consistent over time, regardless of the microscope employed. Further, the calibration process should be as fast as possible to minimize downtime of the microscopes and to maximize the throughput (the number of tissue slides imaged per day) in the lab.

The present disclosure is directed to overcome one or more limitations stated above or similar limitations associated with the conventional arts.

SUMMARY

The shortcomings of the conventional mechanisms are overcome, and additional advantages are provided through the provision of mechanism as disclosed in the present disclosure.

Additional features and advantages are realized through the techniques of the present disclosure. Other embodiments and aspects of the disclosure are described in detail herein and are considered a part of the disclosure.

In one non-limiting embodiment of the disclosure, a calibration slide for calibration of an automated microscope is disclosed. The slide includes at least one calibration zone defined on at least one major surface of the sample slide. The at least one calibration zone is divided by a cross hair to define a plurality of quadrants. Each of the plurality of quadrants is defined with an array of apertures of varying density of arrays.

In an embodiment of the disclosure, intersection of the crosshair defines a center of the calibration slide, and the width of the crosshair ranges from 10 to 50 microns.

In an embodiment of the disclosure, the plurality of quadrants includes a first quadrant, a second quadrant and a fourth quadrant. The distance between each of apertures in the array of apertures in the first quadrant ranges from 25 microns to 30 microns. Further, the distance between each of apertures in the array of apertures in the second quadrant ranges from 65 microns to 75 microns. Furthermore, distance between each of apertures in the array of apertures in the third quadrant and fourth quadrant ranges from 50 microns to 60 microns and 35 microns to 45 microns, respectively.

In an embodiment of the disclosure, the pre-defined dimension of the apertures in each of the array of apertures ranges from 10 microns to 15 microns.

In another non-limiting embodiment of the disclosure, an automated microscope is disclosed. The automated microscope includes an analysis module which includes an image capturing unit and an optical unit. The automated microscope further includes a slide stage structured to accommodate a calibration slide. The calibration slide includes at least one calibration zone which is divided by a cross hair to define a plurality of quadrants, wherein, each of the plurality of quadrants is defined with an array of apertures of varying density. A plurality of actuators is coupled to the slide stage. Each of the plurality of actuators is configured to displace the slide stage in at least one of X, Y, and Z axis. The automated microscope also includes a control unit which is communicatively coupled to the analysis module and the plurality of actuators. The control unit is configured to displace the slide stage to position the calibration slide under the analysis module, upon receiving a signal to initiate calibration of the automated microscope. The control unit determines the position of the analysis module with respect to the plurality of quadrants defined in the at least one calibration zone by processing a first image captured by analysis module. Further, the control unit is configured to determine tilt angle of the analysis module with respect to an array of apertures defined in one of the plurality of quadrants. The control unit further orients the analysis module with respect to the array of apertures defined in one of the plurality of quadrants based on the determined tilt angle. A travel path between a point of focus of the analysis module and the center of crosshair is determined by the control unit by processing a second image captured by the analysis module. The control unit is further configured to operate at least one of the slide stage and the analysis module along the determined travel path to align the point of focus of the analysis module with the center of crosshair.

In an embodiment of the disclosure, the automated microscope includes an image processing module associated with the control unit to process the first image and the second image captured by the analysis module.

In an embodiment of the disclosure, the automated microscope includes a memory unit associated with the control unit. The memory unit is configured to store a calibration data of the automated microscope.

In an embodiment of the disclosure, the plurality of actuators are electric motors.

In an embodiment of the disclosure, processing of the first image is performed by analyzing the tilt of the first image along the X and Y axis with respect to the array of apertures in one of the plurality of quadrants.

In an embodiment of disclosure, the analyzing module is oriented to correct the tilt in the first image by connecting a center of the array of apertures with a line and measuring the angle of the line with respect to the first image in X and Y axis.

In an embodiment of the disclosure, processing of the second image is performed to determine distance between apertures in the array of apertures by analyzing a pixel per micron value of a different portions in the second image.

In an embodiment of the disclosure, the travel path is determined based on the distance between apertures in the array of apertures.

In an embodiment of the disclosure, operating at least one of the slide stage and the analysis module in determined travel path includes moving in a first direction to reach a portion of the crosshair and moving in a second direction to reach the center of the crosshair. The analysis module captures a third image, and the control unit processes the third image to determine the center of the cross hair.

In yet another non-limiting embodiment of the disclosure, a method of calibrating an automated microscope using a sample slide is disclosed. The method includes positioning a calibration slide on a slide stage of the automated microscope. The method further includes operating by a control unit the slide stage to position the calibration slide under an analysis module by actuating a plurality of actuators, upon receiving a signal to initiate calibration of the automated microscope. The control unit is configured to determine position of the analysis module with respect to a plurality of quadrants defined in at least one calibration zone by processing a first image captured by the analysis module. The control unit further determines tilt angle of the analysis module with respect to an array of apertures defined in one of the plurality of quadrants. The analysis module is oriented by the control unit with respect to the array of apertures defined in one of the plurality of quadrants based on the determined tilt angle. The control unit determines a travel path between a point of focus of the analysis module and a center of crosshair based by processing a second image captured by the analysis module. The control unit operates at least one of the slide stage and the analysis module along the determined travel path to align the point of focus of the analysis module with the center of crosshair.

The foregoing summary is illustrative only and is not intended to be in any way limiting. In addition to the illustrative aspects, embodiments, and features described above, further aspects, embodiments, and features will become apparent by reference to the drawings and the following description.

BRIEF DESCRIPTION OF THE ACCOMPANYING FIGURES

The novel features and characteristic of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
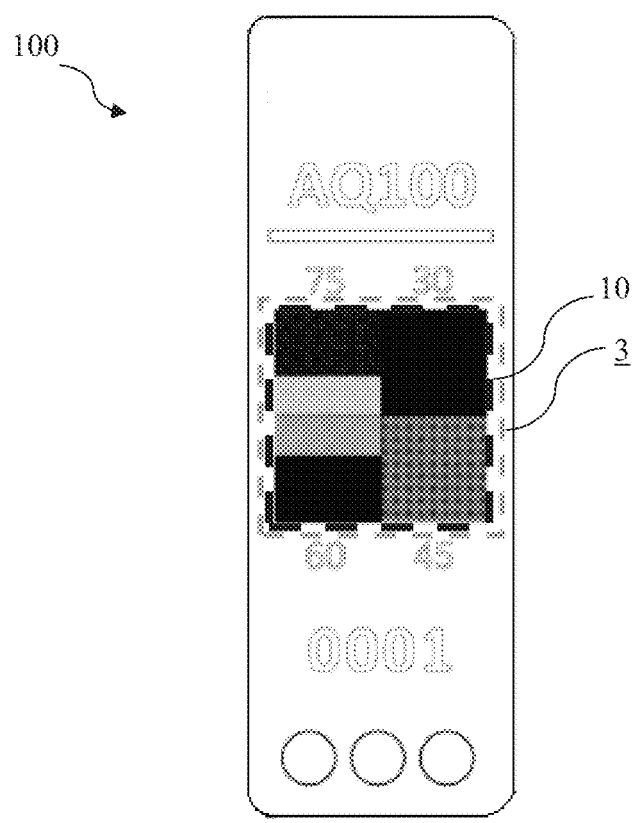
FIG. 1 illustrates schematic view of a calibration slide with calibration zone, in accordance with an embodiment of the disclosure.

The figures depict embodiments of the disclosure for purposes of illustration only. One skilled in the art will readily recognize from the following description that alternative embodiments of the mechanism illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure.

It should be appreciated by those skilled in the art that the conception and specific embodiments disclosed may be readily utilized as a basis for modifying or designing other systems for carrying out the same purposes of the present disclosure. It should also be realized by those skilled in the art that such equivalent processes do not depart from the scope of the disclosure as set forth in the appended claims. The novel features which are believed to be characteristics of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Embodiments of the present disclosure describe an automated microscope and a method of calibrating the same. Also, a sample slide/a calibration slide used for calibrating the automated microscope is also disclosed. The system of the present disclosure enables corrective maintenance. Also, the system of the present disclosure enables to monitor health of various components of the automated microscope. The system ensures that, consistently high-quality images being captured for each analysis to provide consistent and accurate end results.

The automated microscope of the present disclosure includes an analysis module having an image capturing unit and an optical unit. The automated microscope may further include a slide stage structured to accommodate a calibration slide. The calibration slide includes at least one calibration zone defined on at least one major surface of the calibration slide. The at least one calibration zone includes a cross hair that is configured to define a plurality of quadrants. Each of the plurality of quadrants may be defined with an array of apertures of varying density. In an embodiment, the crosshair, and the plurality of array of apertures may be defined on the calibration slide by at least one of CNC micro milling, photomasking and the like. Further, distance between each of apertures in the array of apertures in each of the plurality of quadrants may range from 25 microns to 80 microns. The calibration slide may be positioned on the slide stage. The slide stage is movably coupled to a base of the automated microscope. The automated microscope further includes a plurality of actuators coupled to the slide stage. The plurality of actuators may be a rotary actuator such as but not limiting to electric motors including servomotors and the like. Each of the plurality of actuators is configured to displace the slide stage in at least one of X, Y and Z axis.

The plurality of actuators and the analysis module may be communicatively coupled to a control unit associated with the automated microscope. The control unit is configured to displace the slide stage to position the calibration slide under the analysis module, upon receiving a signal to initiate calibration of the automated microscope. The control unit is configured to process a first image captured by the analysis module. The first image is processed by the control unit to determine the position of the analysis module with respect to the plurality of quadrants defined in at least one calibration zone. Further, a tilt in the analysis module is determined by the control unit. The tilt or tilt angle of the analysis module is determined by the control unit with respect to the array of apertures defined in one of the plurality of quadrants. Once the tilt is identified, the control unit orients the analysis module with respect to the array of apertures defined in one of the plurality of quadrants based on the determined tilt angle. A second image is captured by the analysis module and is processed by the control unit to determine a travel path between a point of focus of the analysis module and center of the crosshair. Further, at least one of the slide stage and the analysis module is operated by the control unit along the travel path to align the point of focus of the analysis module with the center of the crosshair. In an embodiment, the captured images such as first and second images may be processed by an image processing unit associated with the control unit. The calibration data may be stored in a memory unit associated with the control unit. The stored calibration data may be used to calibrate the microscope during maintenance of the microscope.

The terms "comprises . . . a", "comprising", or any other variations thereof used in the specification, are intended to cover a non-exclusive inclusion, such that an assembly that comprises a list of components or steps does not include only those components or steps but may include other components or steps not expressly listed or inherent to such setup or method. In other words, one or more elements in an assembly proceeded by "comprises . . . a" does not, without more constraints, preclude the existence of other elements or additional elements in the assembly.

Henceforth, the present disclosure is explained with the help of one or more figures of exemplary embodiments. However, such exemplary embodiments should not be construed as limitation of the present disclosure. In the figures the complete system for smearing biological sample is not depicted for the purpose of simplicity. One skilled in the art would appreciate that the system may be employed in the smearing process of various biological samples including the samples of low viscosity and the like.

The following paragraphs describe the present disclosure with reference to FIGS. 1 to 4. In the figures, the same element or elements which have similar functions are indicated by the same reference signs. The systems and techniques described here relate to calibrating an automated microscope (301) or a computer-controlled microscope. For the purposes of promoting an understanding of the principles of the disclosure, reference will now be made to specific embodiments illustrated in the drawings and specific language will be used to describe the same. It will nevertheless be understood that no limitation of the scope of the disclosure is thereby intended, such alterations and further modifications in the illustrated methods, and such further applications of the principles of the disclosure as illustrated therein being contemplated as would normally occur to one skilled in the art to which the invention pertains.

The following detailed description is merely exemplary in nature and is not intended to limit application and uses. Furthermore, there is no intention to be bound by any theory presented in the preceding background or summary or the following detailed description. It is to be understood that the disclosure may assume various alternative orientations and step sequences, except where expressly specified to the contrary. It is also to be understood that the specific devices or components illustrated in the attached drawings and described in the following specification are simply exemplary embodiments of the inventive concepts defined in the appended claims. Hence, specific dimensions or other physical characteristics relating to the embodiments that may be disclosed are not to be considered as limiting, unless the claims expressly state otherwise. Hereinafter, preferred embodiments of the present disclosure will be descried referring to the accompanying drawings. While some specific terms of "upper," "lower," "right," or "left", "vertical" or "horizontal" and other terms containing these specific terms and directed to a specific orientation of the system as shown in figures and the purpose of usage of these terms or words is merely to facilitate understanding of the present disclosure referring to the drawings. Accordingly, it should be noted that the meanings of these terms or words should not improperly limit the technical scope of the present disclosure.

A microscope system in general may include an automated microscope (301) that may be communicatively interfaced with a control unit (300) having a display unit. The control unit (300) may be representative of any special-purpose or conventional computer, such as a desktop, laptop, or a host computer. The control unit (300) may be loaded with appropriate instructions for image-processing, image analysis and the like. The display unit may be any special-purpose or conventional display device (e.g., a computer monitors) that may output graphical images to operator. The automated microscope (301) may be a computer-controlled microscope suitable for use in an automated imaging system. The automated microscope (301) may include an analysis module (AM) having an image capturing unit (IU) and an optical unit (OU), one or more sensors, one or more actuators, a turret, and an image processing unit (Ip). In an embodiment, the image capturing unit (IU) and the optical unit (OU) (i.e., lens) may be mounted on the turret. The image capturing unit (IU) may be mounted on the turret such that its aperture is aligned with the field of view of the optical unit (OU) associated with the turret. The image capturing unit (IU) may be a camera that may have selectable resolution capabilities. In some embodiments, the analysis module (AM), the image processing unit (IP), the one or motors and other components may be communicatively connected to the control unit (300) of the automated microscope (301). The control unit (300) may be configured to operate the analysis module (AM), and the image processing unit (IP) of the automated microscope (301) based on the image-processing and image-analysis techniques loaded into the control unit (300).

The automated microscope (301) further includes a slide stage structured to accommodate a calibration slide (100). The slide stage may be movably coupled to a base of the automated microscope (301). In an embodiment, the slide stage may be coupled to a plurality of actuators. Each of the plurality of actuators is configured to displace the slide stage in at least one of X, Y and Z axis. The plurality of actuators is a rotary actuator such as electric motor including at least one of servo motors or rotating piezoelectric motors and the like. The plurality of actuators may be configured to drive the slide stage in one or more directions. One of the plurality of actuators which is a first actuator may permit movement of the slide stage in one linear direction, e.g., along X axis, and a second actuator of the plurality of actuators may permit movement of the slide stage in second linear direction, e.g., along Y axis. Further, a third actuator of the plurality of actuators permits movement of the slide stage along Z axis. In an embodiment, the movement of slide stage in the X, Y and Z directions permits the calibration slide (100) mounted on the slide stage to be moved into alignment with the analysis module (AM).

The calibration slide (100) of the present disclosure accommodated on the slide stage may aid in calibrating the automated microscope (301) as described above. As shown in FIG. 1, the calibration slide (100) may be made of materials such as but not limiting to glass or polymer. In an embodiment, the dimensions of the calibration slide (100) may be standard dimensions used in the biomedical field. In an exemplary embodiment, the dimensions of the calibration slide may be 75 mm in length (L), 25 mm in width (W) and 1.5 mm in thickness (T). Herein above and below, the calibration slide (100) and slide (100) may be interchangeably used.

Figure 2A:
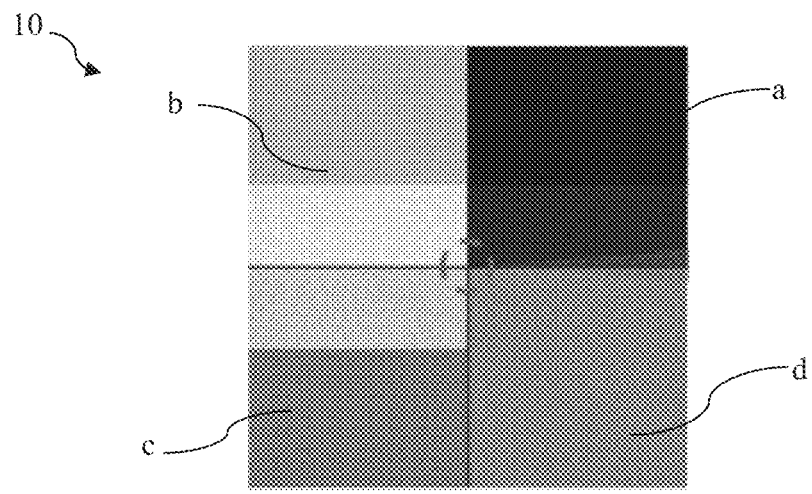
FIG. 2a illustrates detailed view of the calibration zone of FIG. 1.
Figure 2B:
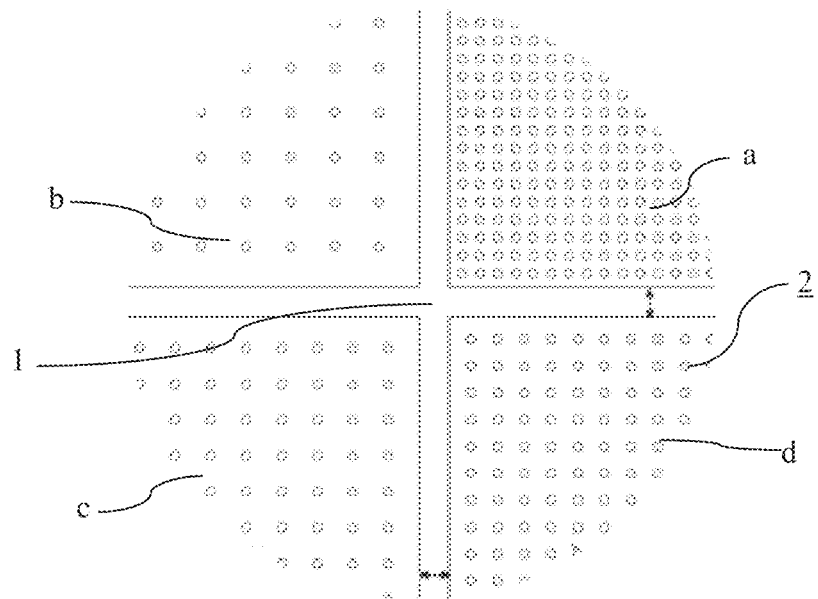
FIG. 2b illustrates a magnified of the calibration zone of FIG. 1 depicting plurality of quadrants, in accordance with an embodiment of the disclosure.

The calibration slide (100) may include at least one calibration zone (10) [best shown in FIG. 2a] defined on at least one major surface of the calibration slide. The at least one calibration zone (10) may include a cross hair (1). In an embodiment, the crosshair (1) may include two perpendicular paths, wherein intersection defining a center of the at least one calibration zone (10). The cross hair (1) defines a plurality of quadrants (a, b, c, and d) in the calibration zone (10). The plurality of quadrants (a, b, c, and d) may include a first quadrant (a), a second quadrant (b), a third quadrant (c) and a fourth quadrant (c). Each of the plurality of quadrant (a, b, c, and d) may be defined with an array of apertures (2) of pre-defined dimensions [best shown in FIG. 2b]. The array of apertures in each of the plurality of quadrants (a, b, c, and d) may be of varying densities which may be elucidate further in the disclosure. In an embodiment, the crosshair (1) and the array of apertures (2) may be defined on the calibration slide (100) by a suitable machining process including CNC micro milling, photomasking and the like. The width of the cross hair (1) may range from 10 microns to 50 microns. In another embodiment, the pre-defined dimension of the array if apertures (2) may range from 10 microns to 15 microns.

In an embodiment, the first quadrant (a) on the at least one calibration zone (10) may include an array of apertures (2) and distance between each of the array of apertures (2) may range from 25 microns to 30 microns. Further, the array of apertures (2) in the second quadrant (b) may be distanced from each other at a distance ranging from 65 to 75 microns. Further, the distance between each of the array of apertures (2) in the third quadrant (c) may range from 50 microns to 60 microns. Likewise, the distance between each of the array of apertures (2) in the fourth quadrant (d) may range from 35 microns to 45 microns. The distance between each of the array of apertures (2) are structured in the plurality of quadrants (a, b, c, and d) such that the plurality of quadrants (a, b, c, and d) may be differentiated easily by the analysis module (AM). The distance between each aperture of the array of apertures disclosed above should not be construed as a limitation of the present disclosure. The calibration slide (100) of the above-described configuration may be accommodated on the slide stage of the automated microscope (301). The calibration slide (100) may be used in the automated microscope (301) to calibrate the automated microscope (301). The process of calibration using the calibration slide (100) may hereinafter be elucidated with reference to FIGS. 3 and 4 in conjunction with FIGS. 1 to 2b.

Figure 3:
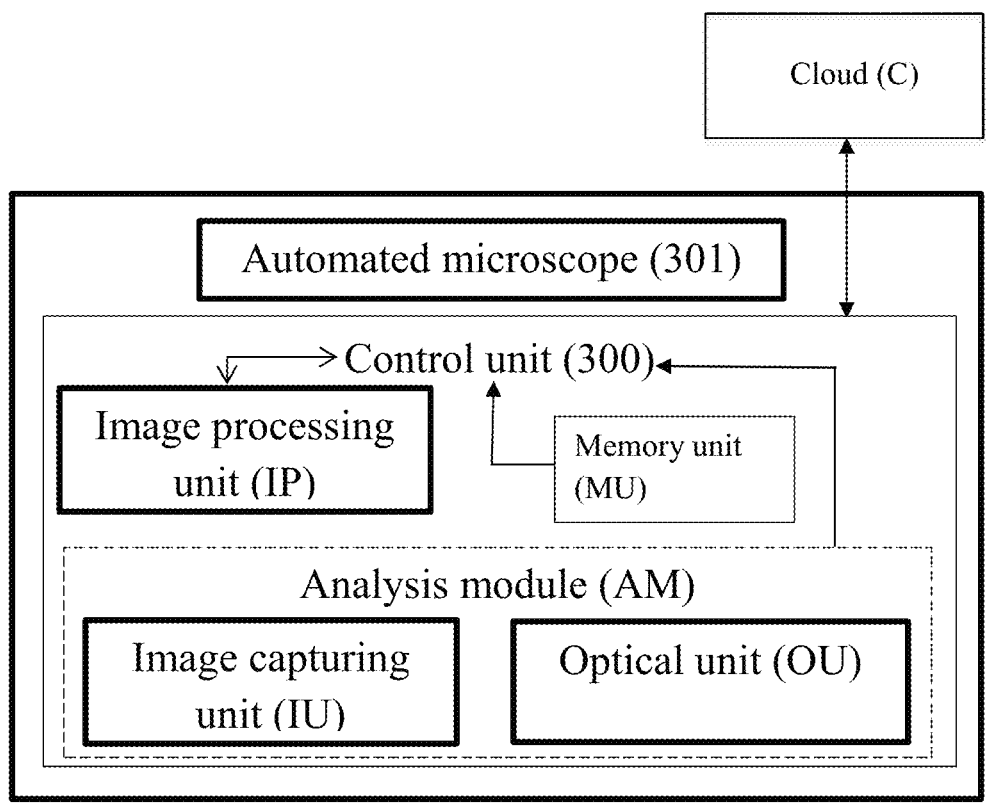
FIG. 3 illustrates a block diagram of the automated microscope, in accordance with an embodiment of the disclosure.
Figure 4:
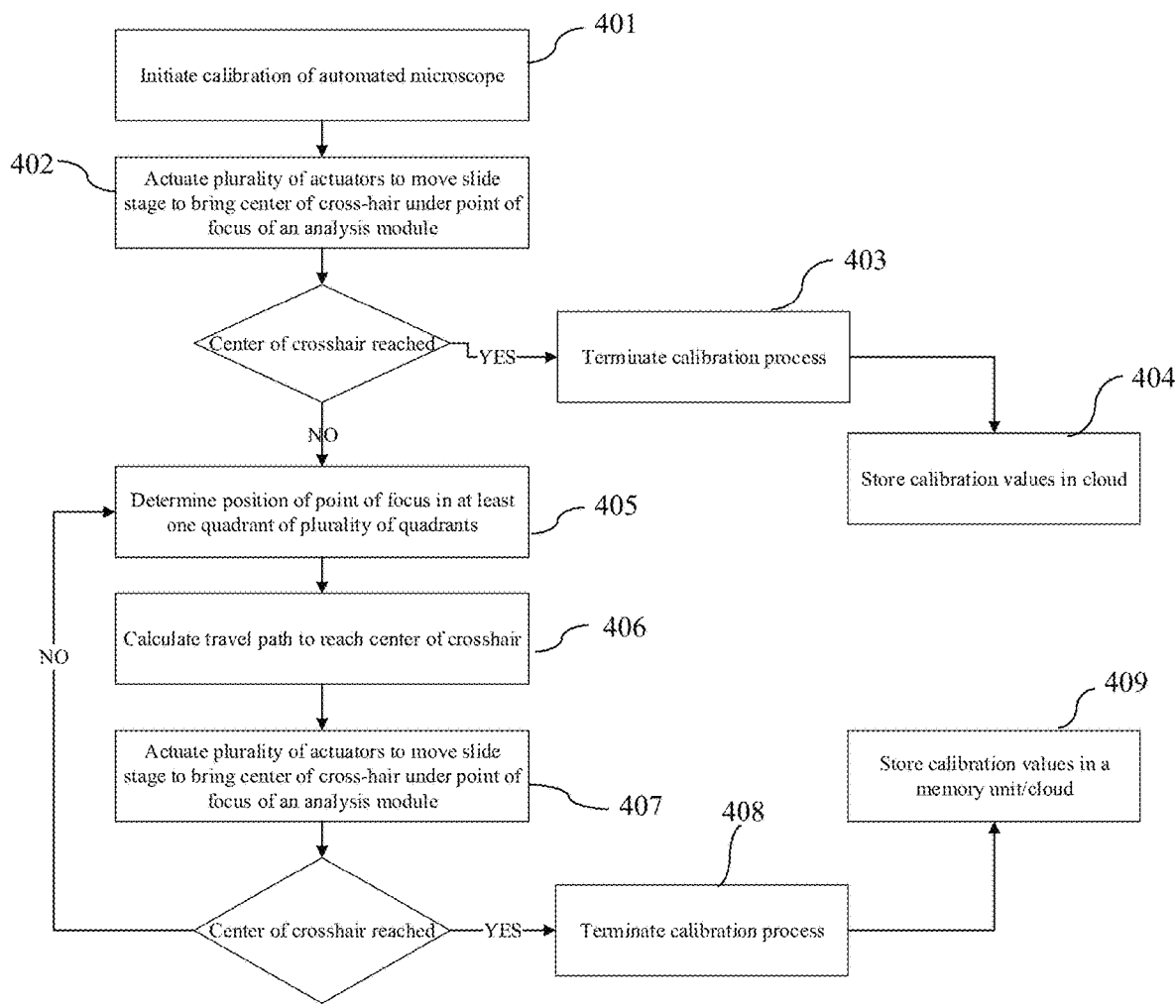
FIG. 4 illustrates a flow diagram of the calibration process using the calibration slide of FIG. 1, in accordance with an embodiment of the present disclosure.

FIG. 3 is an exemplary block diagram of functional elements of the automated microscope (301). FIG. 4 is an exemplary embodiment of the present disclosure, illustrating a flowchart of a method of calibrating the automated microscope (301), where plurality of trials is performed to determine the injecting timing of the fuel at the right timing.

As illustrated in FIG. 4, the method comprises one or more blocks illustrating a method for determining the fuel ignition timing in the first start of the engine. The method may be described in the general context of computer-executable instructions. Generally, computer-executable instructions can include routines, programs, objects, components, data structures, procedures, modules, and functions, which perform functions or implement abstract data types.

The order in which the method is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

In operation, the control unit (300) of the automated microscope (301) may operate the plurality of actuators associated with the slide stage to displace the slide stage to position the calibration slide (100) under a point of focus of the analysis module (AM). As shown at block 401, the control unit (300) may operate the plurality of actuators based on a received signal to initiate calibration of the microscope. The slide stage may displace in a pre-defined direction to position the calibration slide (100) under the analysis module (AM). In general instances and as shown at block 405, a central portion [i.e., center of the crosshair] of the calibration slide (100) would not be positioned under the point of focus of the analysis module (AM). In such instances, the control unit (300) may be determining the position of the point of focus of the analysis module (AM) with respect to the plurality of quadrants (a, b, c, and d) [as shown at 405]. The image capturing unit (IU) that may be associated with the analysis module (AM) may be configured to capture a first image. In an embodiment, the image processing module associated with the control unit (300) is configured to process the first image captured by the image capturing unit (IU). The first image may be processed to analyze/determine tilt angle of the analysis module (AM) with respect to the array of apertures (2) defined in one the plurality of quadrants (a, b, c, and d). In an embodiment, processing of the first image may be performed by analyzing the tilt of the first image along the X and Y axis with respect to the array of apertures (2). Based on the tilt angle determined, the control unit (300) may orient the analysis module (AM) with respect to the array of apertures defined in one of the plurality of quadrants (a, b, c, and d). In an embodiment, the analysis module (AM) may be oriented to correct the tilt in the first image by connecting a center of the array of apertures with a line and measuring the angle with respect to first image in X and Y axis. In an exemplary embodiment, if the center crosshair (1) is positioned under the point of focus of the analysis module (AM) in the initial displacement, the control unit (300) terminates further process and stores the calibrated values for further calibrations [as shown at block 403 and 404]. In case, the center of the crosshair (1) is not positioned under the point of focus, the control unit (300) further initiates the process to reach the center of the crosshair (1).

Once, the analysis module (AM) is oriented with respect to the array of apertures (2), a second image may be captured by the image capturing unit (IU) of the analysis module (AM). The second image may be processed to determine distance between apertures in the array of apertures (2). The distance between the array of apertures (2) may be analyzed by analyzing a pixel per micron value of a different portions in the second image. Based on the analysis of the second image, the analysis module (AM) associated with the control unit (300) may determine the quadrant of the plurality of quadrants (a, b, c, and d) in which the point of focus of the analysis module (AM) is located. The control unit (300) may further determine a travel path between a point of focus of the analysis module (AM) and the center of cross hair based on processing of the second image. In an embodiment and as shown at block 406, the travel path may be determined based on the distance between apertures in the array of apertures (2). Further, the control unit (300) may operate at least one of the slide stage and the analysis module (AM) along the determined travel path to align the point of focus of the analysis module (AM) with the center of cross hair (1). The at least one of the slide stage and the analysis module (AM) may be operated in the determined travel path by moving in a first direction and then moving in a second direction [as shown at block 407]. In an embodiment, moving the slide stage in a first direction may bring the calibration slide (100) under the point of focus of the analysis module (AM) on a portion of the crosshair (1). Once the portion of crosshair (1) is determined, the slide stage moves in the second direction to reach the center of the crosshair (1). For example, the position of point of focus of the analysis module (AM) may be in first quadrant (a) of the plurality of quadrants. Initially, the slide stage may be displaced by the plurality of actuators in at least one of vertical direction and horizontal direction [i.e., first direction] to reach the portion of the crosshair (1). Once, the slide stage positions the portion of the crosshair (1) of the calibration slide (100) under point of focus of the analysis module (AM), the actuator of the plurality of actuators displaces the slide stage in second direction to reach the center of crosshair (1). In an embodiment, movement of the slide stage in the first direction and the second direction may be achieved sequentially. That is the analysis module (AM) may take multiple images (i.e., focus) and analyze the same to reach the center of crosshair taking small steps towards the center of crosshair (1). In an embodiment, the calibration data may be stored in a memory unit (MU) associated with the control unit (300). The calibration data stored in the memory unit (MU) may be used for calibrating the microscope at pre-determined intervals. In an embodiment, the calibration data may be stored in cloud [C] and the data may be used for calibration of automated microscope (301) by online means for automated microscopes (301) in different laboratories. Upon reaching the center of crosshair (1) the control unit (301) terminates the process as shown at block 408 and 409.

In some embodiments, the control unit (300) may be disposed in communication with one or more memory devices (e.g., RAM, ROM etc.) via a storage interface. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computing system interface (SCSI), etc. The memory drives may further include a drum, magnetic disc drive, magneto-optical drive, optical drive, redundant array of independent discs (RAID), solid-state memory devices, solid-state drives, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, VDs, flash drives, disks, and any other known physical storage media.

The automated microscope (301) including the calibration slide of the present disclosure enables corrective maintenance. The method described above can be used across various automated microscopes (301) within a lab or at labs at various locations through offline/online mode to achieve similar results when tested on same sample. The stored calibrated values may be used to calibrate multiple microscopes to achieve similar results when tested on same sample. Also, the method of the present disclosure enables to monitor health of various components of the automated microscope (301). The method ensures a consistently high image quality being captured for each analysis to provide consistent and accurate end results.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding the description may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated in the description.

TABLE OF REFERRAL NUMERALS

| Reference Number | Description |
| --- | --- |
| 100 | Sample slide/Calibration slid |
| 10, a, b, c and d | Calibration zones and quadrants |
| 1 | Cross hair |
| 3 | Cover slip |
| 301 | Automated microscope |
| 300 | Control unit |
| IP | Image processing unit |
| MU | Memory unit |
| AM | Analysis module |
| IU | Image capturing unit |
| OU | Optical unit |
| C | Cloud |
| 401-409 | Flow diagram |

The invention claimed is:

1. A calibration slide for calibration of an automated microscope, the slide comprising: at least one calibration zone defined on at least one major surface of the slide, wherein, the at least one calibration zone is divided by a cross hair to define a plurality of quadrants, wherein, each of the plurality of quadrants is defined with an array of apertures of varying density of arrays, wherein the plurality of quadrants includes a first quadrant, a second quadrant, a third quadrant and a fourth quadrant, and wherein a predefined dimension of the apertures in each of the arrays of apertures ranges from 10 microns to 15 microns.

2. The slide as claimed in claim 1, wherein an intersection of the crosshair defines a center of the calibration slide.

3. The slide as claimed in claim 1, wherein distance between each of apertures in the array of apertures in the first quadrant (a) ranges from 25 microns to 30 microns.

4. The slide as claimed in claim 1, wherein distance between each of apertures in the array of apertures in the second quadrant (b) ranges from 65 microns to 75 microns.

5. The slide as claimed in claim 1, wherein distance between each of apertures in the array of apertures in the third quadrant (c) ranges from 50 microns to 60 microns.

6. The slide as claimed in claim 1, wherein distance between each of apertures in the array of apertures in the fourth quadrant (d) ranges from 35 microns to 45 microns.

7. The slide as claimed in claim 1, wherein a width of the crosshair ranges from 10 to 50 microns.

8. An automated microscope, comprises:
an analysis module comprising:
    an image capturing unit; and
    an optical unit;
a slide stage structured to accommodate a calibration slide, wherein the slide stage is movably coupled to a base of the automated microscope, wherein, the calibration slide includes at least one calibration zone defined on at least one major surface of the sample slide, wherein, the at least one calibration zone is divided by a cross hair to define a plurality of quadrants, and wherein, each of the plurality of quadrants is defined with an array of apertures of varying density of arrays;
a plurality of actuators coupled to the slide stage, wherein each of the plurality of actuators is configured to displace the slide stage in at least one of an X, Y, or Z axis; and a control unit communicatively coupled to the analysis module and the plurality of actuators, the control unit configured to,
displace the slide stage to position the calibration slide under the analysis module, upon receiving a signal to initiate calibration of the automated microscope;
determine, the position of the analysis module with respect to the plurality of quadrants defined in the at least one calibration zone by processing a first image captured by the analysis module;
determine, a tilt angle, of the analysis module with respect to the array of apertures defined in one of the plurality of quadrants;
orient, the analysis module with respect to the array of apertures defined in the one of the plurality of quadrants (a, b, c, and d) based on the determined tilt angle;
determine, a travel path, between a point of focus of the analysis module and a center of crosshair by processing a second image captured by the analysis module; and
operate, at least one of the slide stage or the analysis module along the determined travel path to align the point of focus of the analysis module with the center of crosshair.

9. The automated microscope as claimed in claim 8, further comprising an image processing module associated with the control unit to process the first image and the second image captured by the analysis module.

10. The automated microscope as claimed in claim 8, further comprising a memory unit associated with the control unit, wherein the memory unit is configured to store a calibration data of the automated microscope.

11. The automated microscope as claimed in claim 8, wherein the plurality of actuators are electric motors.

12. The automated microscope as claimed in claim 8, wherein processing of the first image is performed by analyzing the tilt of the first image along the X and Y axis with respect to the array of apertures in one of the plurality of quadrants.

13. The automated microscope as claimed in claim 8, wherein the analysis module is oriented to correct the tilt in the first image by connecting a center of the array of apertures with a line and measuring the angle of the line with respect to the first image in X and Y axis.

14. The automated microscope as claimed in claim 8, wherein processing of the second image is performed to determine a distance between apertures in the array of apertures by analyzing a pixel per micron value of different portions in the second image.

15. The automated microscope as claimed in claim 8, wherein the travel path is determined based on the distance between apertures in the array of apertures.

16. The automated microscope as claimed in claim 8, wherein operating at least one of the slide stage and the analysis module in determined travel path includes moving in a first direction to reach a portion of the crosshair and moving in a second direction to reach the center of the crosshair.

17. The automated microscope as claimed in claim 16, wherein the analysis module captures a third image, and the control unit processes the third image to determine the center of the cross hair.

18. A method of calibrating an automated microscope, the method comprising:
positioning a calibration slide on a slide stage of the automated microscope, wherein
the calibration slide comprises at least one calibration zone defined on at least one major surface of the calibration slide,
the at least one calibration zone is divided by a cross hair to define a plurality of quadrants, and
each quadrant of the plurality of quadrants is defined with an array of apertures of varying density of arrays;
displacing, by a control unit, the slide stage to position the calibration slide under an analysis module by actuating a plurality of actuators, upon receiving a signal to initiate calibration of the automated microscope;
determining, by the control unit, position of the analysis module with respect to a plurality of quadrants defined in at the least one calibration zone by processing a first image captured by the analysis module;
determining, by the control unit, a tilt angle of the analysis module with respect to an array of apertures defined in one of the plurality of quadrants;
orienting, by the control unit, the analysis module with respect to the array of apertures defined in one of the plurality of quadrants based on the determined tilt angle;
determining, by the control unit, a travel path between a point of focus of the analysis module and a center of the crosshair by processing a second image captured by the analysis module; and
operating, by the control unit, at least one of the slide stage or the analysis module along the determined travel path to align the point of focus of the analysis module with the center of crosshair.

19. The method as claimed in claim 18, further comprising processing the first image and the second image captured by the analysis module by an image processing module associated with the control unit.

20. The method as claimed in claim 18, further comprising storing a calibration data of the automated microscope by a memory unit associated with the control unit.

21. The method as claimed in claim 20, wherein the calibration data stored in the memory unit is used for calibrating the microscope at pre-determined intervals.

22. The method as claimed in claim 18, wherein processing of the first image is performed by analyzing the tilt of the first image along the X and Y axis with respect to the array of apertures in one of the plurality of quadrants.

23. The method as claimed in claim 18, wherein analysis module is oriented to correct the tilt in the first image by connecting a center of the array of apertures with a line and measuring the angle of the line with respect to the first image in X and Y axis.

24. The method as claimed in claim 18, wherein processing of the second image is performed to determine a distance between apertures in the array of apertures by analyzing a pixel per micron value of different portions in the second image.

25. The method as claimed in claim 18, wherein the travel path is determined based on the distance between apertures in the array of apertures.

26. The method as claimed in claim 18, wherein the operating at least one of the slide stage and the analysis module in determined travel path includes moving in a first direction to reach the crosshair and moving in a second direction to reach the center of the crosshair.

27. The method as claimed in claim 26, further comprising capturing by the analysis module a third image, wherein the third image is processed by the control unit to determine the center of the cross hair.

\* \* \* \* \*